June 27, 1967 L. KATZ 3,328,598

SEMI-CONDUCTOR SWITCHING CIRCUIT WITH AUTOMATIC UNLOCK

Filed June 24, 1963

INVENTOR.
LEONHARD KATZ

BY Rines and Rines

ATTORNEYS

United States Patent Office 3,328,598

Patented June 27, 1967

3,328,598

SEMI-CONDUCTOR SWITCHING CIRCUIT WITH AUTOMATIC UNLOCK

Leonhard Katz, Woburn, Mass., assignor to Astro Dynamics, Inc., Burlington, Mass., a corporation of Massachusetts Filed June 24, 1963, Ser. No. 290,132
7 Claims. (Cl. 307—88.5)

This invention relates to semi-conductor switching circuits, and more particularly to circuits of the type having a pair of switches arranged to be turned on alternately.

A common type of switching circuit employed for example, in power supplies and brushless motors, comprises semi-conductor devices which are rendered alternately conductive, as by an internal drive obtained from a feedback loop or an external drive obtained from a source of oscillations. One of the difficulties encountered with this type of circuit is that under certain circumstances it is possible for both semi-conductor switches to become conductive concurrently and to remain in the conductive state. This phenomenon, hereinafter ferred to as "lock up," is especially prevalent where devices such as silicon controlled rectifiers are employed. Such rectifiers require only a small voltage (usually between 0.2 and 0.8 volt) applied to the gate electrode to turn the device "on," that is, to render it conductive, but once the rectifier is on, removal of the gate voltage will not turn the device "off" again. The only way in which the switch can be turned off is to reduce the collector-to-emitter voltage to near zero. Once the switch is turned off it will not turn on again until a gate voltage is reapplied.

When lock up occurs, the switching circuit ceases to funcion normally. Current drain may be twice the normal value and yet in the case of a motor or other magnetically actuated device, there will be no net magnetic flux. Furthermore, it is difficult to unlock the switches, because the normal switching action is relied upon to reduce the applied voltage to the value required to turn the switch off.

Accordingly, it is a principal object of the present invention to provide a solution to the foregoing problem.

A further object of the invention is to provide switching circuits which are automatically controlled to alleviate lock up.

Another object of the invention is to provide improved apparatus for use in power supplies, brushless motors, and the like.

A further object of the invention is to provide apparatus for correcting or inhibiting improper operation of a push-pull circuit.

Briefly stated, a representative but not restrictive embodiment of the invention comprises a circuit having a pair of semiconductor switches connected for normal push-pull operation. Relay apparatus senses a pair of signals in the switching circuit and interrupts the operation of the switching circuit when the signals differ from a predetermined relationship. Abnormal signal relationship indicates lock up, and the interruption of the switching circuit permits the switches to return to normal operation.

The foregoing and other objects, advantages, and features of the invention and the manner in which the same are accomplished will become more readily apparent upon consideration of the following detailed description of the invention taken in conjunction with the accompanying drawings, which illustrate preferred and exemplary embodiments and wherein.

Figure 1:
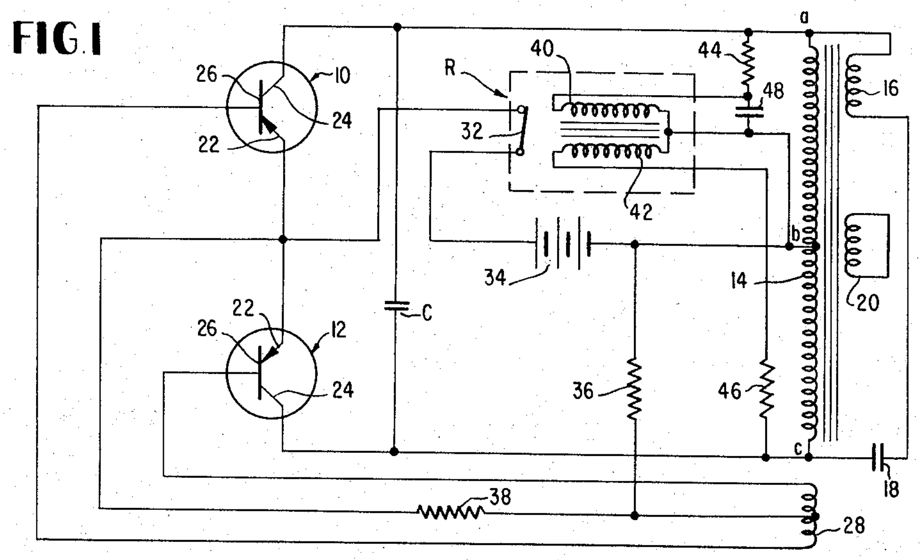
FIGURE 1 is a circuit diagram of a first embodiment of the invention.
Figure 2:
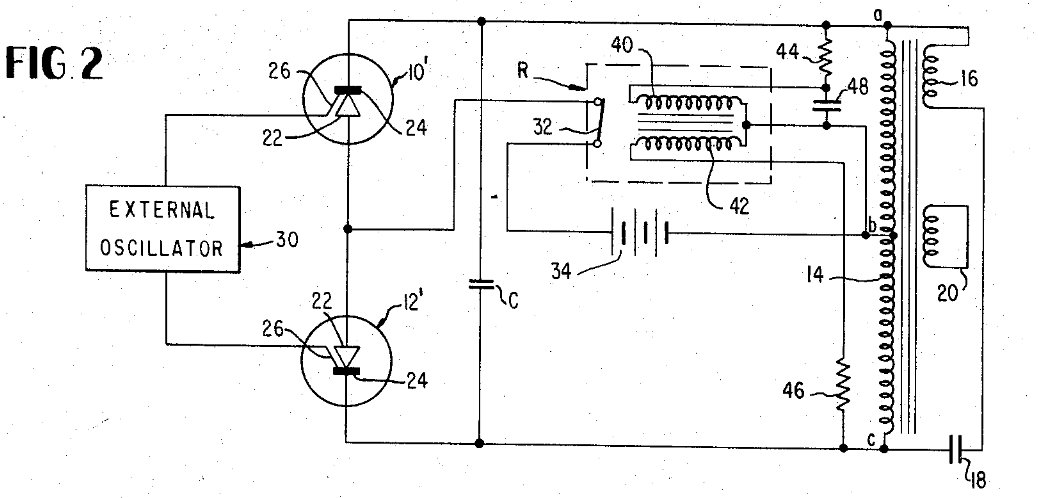
FIGURE 2 is a circuit diagram of another embodiment of the invention.

The drawings illustrate application of the principles of the invention to representive brushless electric motors, but the invention may be applied to other types of circuits susceptible to lock up or similar phenomena, as for example, the switching circuits employed in power supplies. FIGURE 1 illustrates an internally driven circuit, that is, a circuit connected regeneratively to produce oscillations, while FIGURE 2 illustrates an externally driven circuit, that is, a circuit in which the actuating or drive signals for the switches are obtained from an independent source, such as an external oscillator. In each circuit there is shown, for illustrative purposes, a pair of switches 10 and 12, or 10' and 12', a main or stator winding 14, a starting winding 16, a starting condenser 18, and a rotor 20 shown diagrammatically as a shorted winding. In the form shown, the starting winding and starting condenser are connected in series between the ends *a* and *c* of the stator winding 14, and the starting winding and the stator winding are electromagnetically coupled to the rotor 20 so as to start and maintain the rotation of the rotor upon application of the proper energizing potentials. The illustrated number and arrangement of windings are representative of one of the various types of motors to which the invention may be applied, among which are the motors described in the applicant's prior application, Ser. No. 804,750, filed Apr. 7, 1959, for Direct-Current Motor and the Like, now Patent No. 3,098,958, granted July 23, 1963.

The invention is especially useful in circuits employing switches of the semi-conductor type, such as transistors, as shown in FIG. 1, and particularly silicon controlled rectifiers, as shown in FIG. 2 such switches may be used in either embodiment. In the form shown each switch comprises a common electrode 22, an output electrode 24, and an input, base, gate, or control electrode 26. The output electrodes are connected, respectively, to the ends *a* and *c* of the main winding 14. In FIGURE 1 the input electrodes are connected to the ends of a feedback winding 28 coupled to the main winding 14 and arranged to provide drive signals of opposite polarity to the input electrodes. In FIGURE 2 the input electrodes are connected to the external oscillator 30, which applies oscillations of opposite polarity thereto, such as sine waves 180° out of phase. The common electrodes are connected through a switch 32 of a relay R to one side of a DC power supply 34, the other side of which is connected to the center tap *b* of the main winding 14. The DC supply is poled to provide proper operating potential for the switches 10 and 12, or 10' and 12'. In the embodiment of FIGURE 1 one side of the power supply is also connected through a starting resistor 36 to the center tap of feedback winding 28, which is connected through a starting resistor 38 to the common electrodes of the switches 10 and 12. The arrangement of starting resistors and feedback winding is merely representative.

The relay R has a pair of windings 40 and 42 arranged to control the switch 32 jointly. One end of winding 40 is connected through an isolating resistor 44 to the output electrode of switch 10 or 10'. The corresponding end of winding 42 is connected through an isolating resistor 46 to the output electrode of switch 12 or 12'. The other end of windings 40 and 42 is connected to the center tap *b* of the main winding 14. Windings 40 and 42 are preferably wound as a bifilar coil. When the potentials applied to the windings through the resistors 44 and 46 have opposite polarity, the flux produced by the windings is cancelled out, assuming equal amplitude. Switch 32 remains in its illustrated normally closed position. However, if the potentials are of the same polarity, the flux produced is additive and is sufficient to open switch 32. A condenser 48 is connected across one of the windings as shown so as to delay the release of the relay when the switch 32 has opened. One of the windings is sufficient to hold switch 32 open, but condensers may be provided for both windings if desired.

Figure 3:
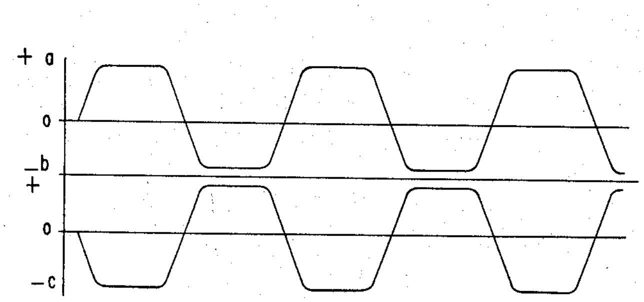
FIGURE 3 is a wave form diagram explanatory of the operation of the invention.

The operation of the invention will now be explained. FIGURE 3 illustrates the relationship between the output signals from the switches, that is, the potentials at points *a* and *c* relative to point *b*, for normal operation of the circuit in which the switches 10 and 12, or 10′ and 12′, are rendered alternately conductive, either by the internal drive arrangements of FIGURE 1 or the external drive arrangement of FIGURE 2. Since the potentials applied to the windings 40 and 42 of the relay R are in opposition, switch 32 remains closed and the circuit operates in the normal fashion. However, in the event that lock up occurs, that is, that both switches 10 and 12, or 10′ and 12′, are concurrently conductive, the polarity of the potentials at points *a* and *c* will be the same, the amplitude approximating the potential difference across the D.C. supply. The resultant additive flux from windings 40 and 42 will open the switch 32, interrupting the energization circuit for the switches from the D.C. supply, and hence terminating the operation of the switching circuit. Interruption of the switching circuit removes the potentials applied therefrom to the windings 40 and 42, but the relay will remain energized until the potential across the condenser 48 drops to the release threshold. Switch 32 will then reclose and normal operation of the switching circuit will ensue, provided that the conditions resulting in lock up are no longer present.

Shunt capacitor C helps turn off silicon-controlled devices 10–12 and serves as a spike reducer where transistor devices 10–12 are employed.

While presently preferred embodiments of the invention have been shown and described, it will be apparent to those skilled in the art that changes can be made without departing from the principles and spirit of the invention, the scope of which is defined in the appended claims. For example, certain aspects of the invention may be employed in other types of circuits, such as those employing gas tubes. Accordingly, the foregoing embodiments are to be considered illustrative, rather than restrictive of the invention, and those modifications which come within the meaning and range of equivalency of the claims are to be included therein.

The invention claimed is:

1. Apparatus of the type described, comprising a pair of electric switch devices each having a common electrode, an input electrode, and an output electrode, a winding connected between said output electrodes, means for connecting an electric supply between said common electrodes and a point on said winding, means for applying push-pull electric drive signals to said input electrodes to produce opposite polarity signals from said output electrodes during normal operation, and means for sensing when said output signals have the same polarity, during abnormal operation, and for interrupting the operation of said switch devices, the last-mentioned means comprising a relay having a pair of windings connected to said output electrodes, respectively, and a switch controlled jointly by said windings.

2. The apparatus of claim 1, said relay switch being part of said electric supply connecting means.

3. The apparatus of claim 1, further comprising a condenser connected across one of said windings.

4. The apparatus of claim 1, each winding being connected to a corresponding output electrode by a resistor.

5. The apparatus of claim 1, said windings being arranged as a bifilar coil.

6. Apparatus of the type described, comprising a pair of electric switch devices each having a common electrode, an input electrode, and an output electrode, a winding connected between said output electrodes, means for connecting an electric supply between said common electrodes and a point on said winding, means for applying push-pull electric drive signals to said input electrodes to produce opposite polarity signals from said output electrodes during normal operation, and means for sensing when said output signals have the same polarity, during abnormal operation, and for interrupting the operation of said switch devices, said switch devices being semi-conductor controlled rectifiers.

7. Apparatus for inhibiting concurrent operation of a pair of switching devices which are normally operated in push-pull, comprising means for deriving a pair of signals from said switching devices which are of opposite polarity when said devices are operating in push-pull but are of the same polarity when said devices are operating concurrently, and means for terminating operation of said devices when they operate concurrently, the last-mentioned means having actuating means controlled by said signals and to which said signals are applied so as to cancel each other when the signals are of opposite polarity but to aid each other when the signals are of the same polarity.

References Cited

UNITED STATES PATENTS

| | | | |
|---|---|---|---|
| 1,975,812 | 10/1934 | Wallace | 331—62 |
| 2,995,690 | 8/1961 | Lemon | 318—138 |
| 3,026,455 | 3/1962 | Smith | 317—148.5 X |
| 3,098,958 | 7/1963 | Katz | 318—138 |
| 3,161,834 | 12/1964 | Noyes | 321—11 X |
| 3,188,529 | 6/1965 | Byrnes | 317—148.5 X |

ORIS L. RADER, *Primary Examiner.*

G. FRIEDBERG, G. Z. RUBINSON, *Assistant Examiners.*